July 14, 1936.  J. BULANDA  2,047,404
AUTOMOBILE LOCK FOR GEAR SHIFT LEVERS
Filed Sept. 15, 1934  2 Sheets-Sheet 2
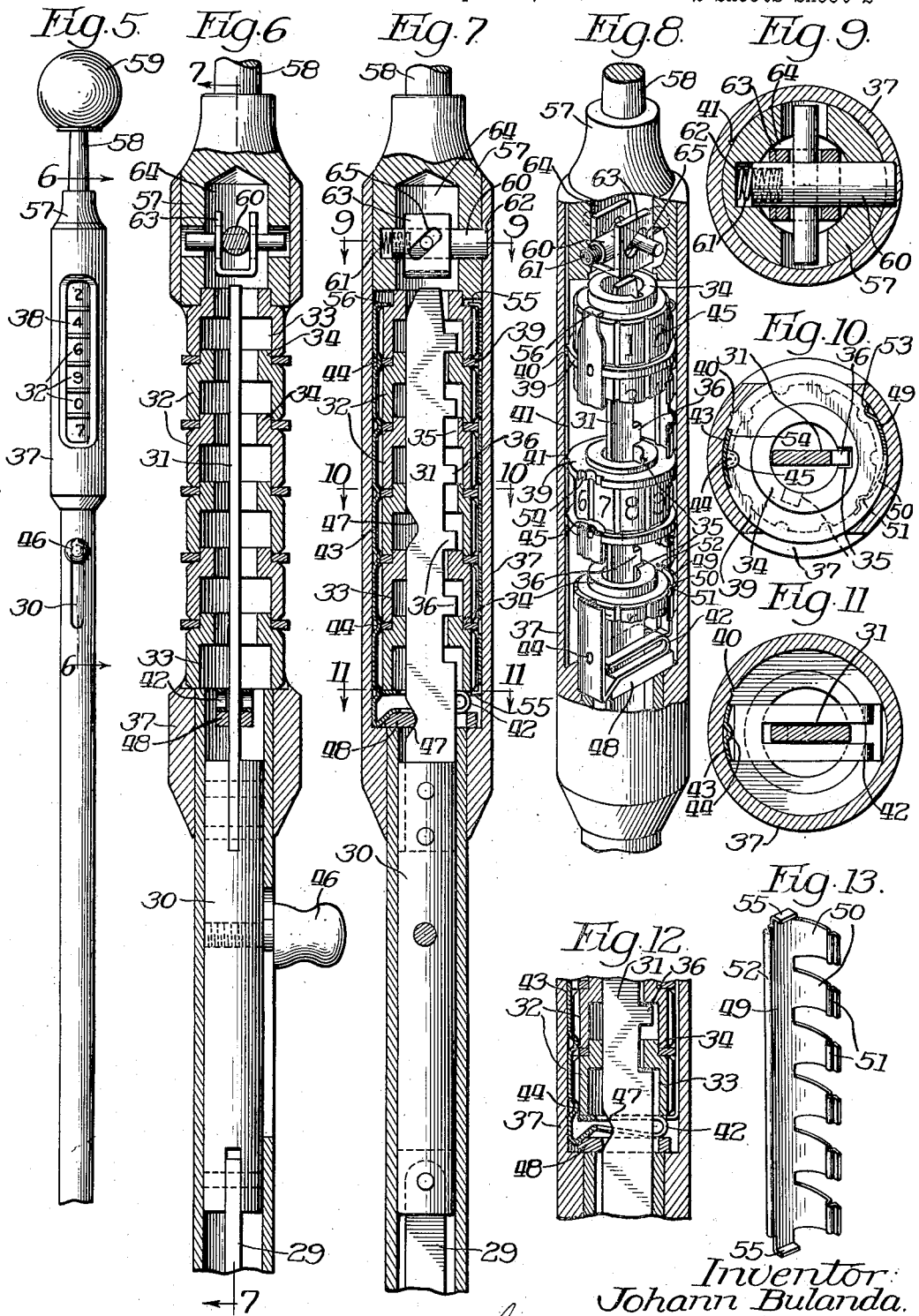
Inventor:
Johann Bulanda.
By Gibson, Mann & Cox,
attys

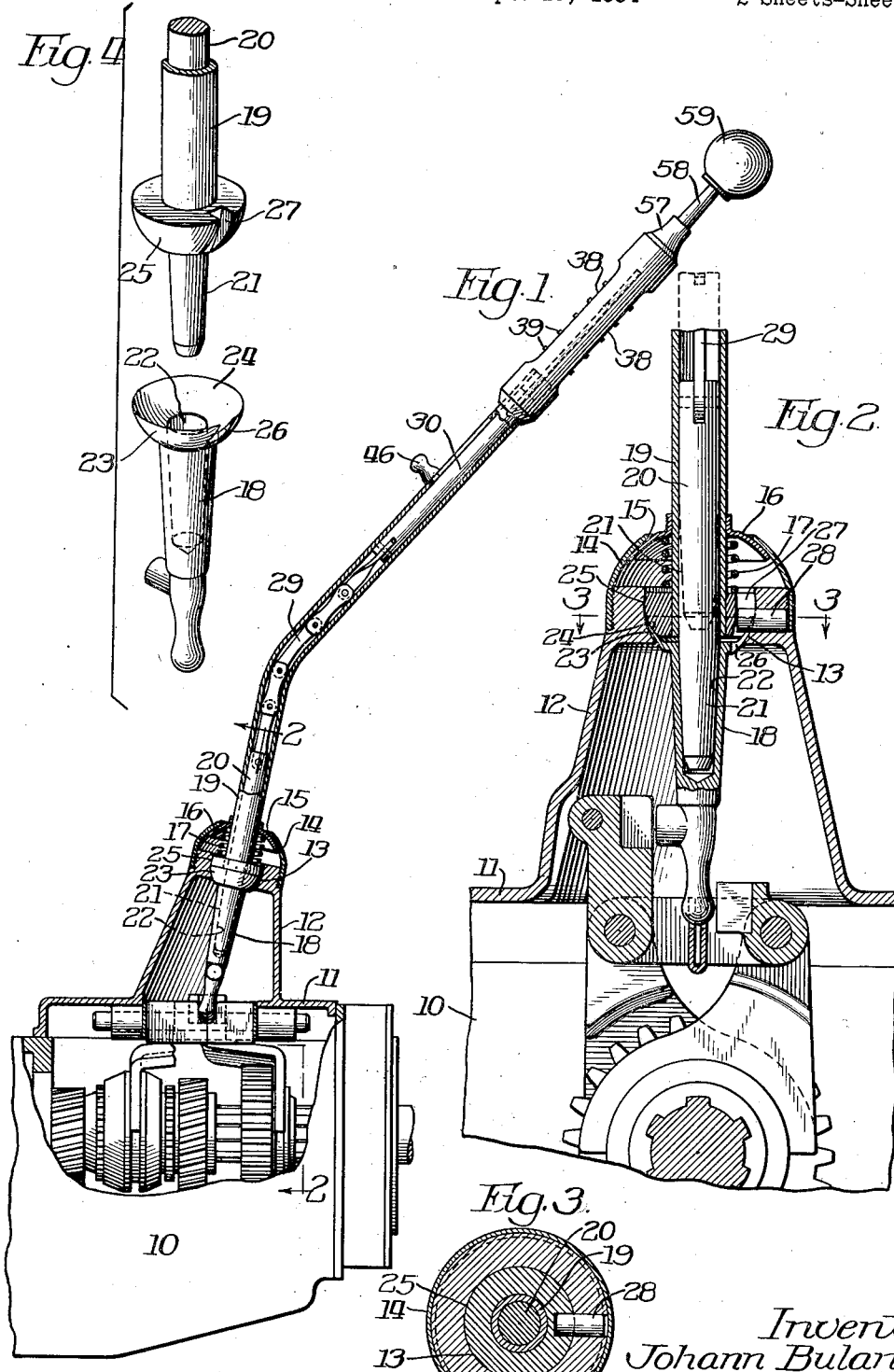

Patented July 14, 1936

2,047,404

UNITED STATES PATENT OFFICE

2,047,404

AUTOMOBILE LOCK FOR GEAR SHIFT LEVERS

Johann Bulanda, Chicago, Ill.

Application September 15, 1934, Serial No. 744,116

13 Claims. (Cl. 70—53)

The principal objects of this invention are to provide a gear shift lever that can be easily substituted for stock levers on various automobiles, and which can be made inoperative to shift gears with a combination lock that cannot be picked by putting pressure on the tumblers and rotating each of them slowly to released or unlocked position. Further objects and advantages of the invention will appear as the description is read in connection with the accompanying drawings illustrating the preferred embodiment, and in which Fig. 1 is a longitudinal sectional view through a part of the transmission gearing and the gear shift lever;

Fig. 2 is a transverse section taken on the line 2—2 of Fig. 1;

Fig. 3 is a horizontal cross section taken on the line 3—3 of Fig. 2;

Fig. 4 is a perspective view of the short arm of the gear shift lever and a portion of the long arm of the gear shift lever, separated slightly to show how they are assembled and held in operative position by a bolt;

Fig. 5 is an elevation of the upper portion of the gear shift lever, showing the relations of the combination lock and the knob forming the handle;

Fig. 6 is a longitudinal vertical section on the line 6—6 of Fig. 5;

Fig. 7 is a similar section on the line 7—7 of Fig. 6;

Fig. 8 is a perspective view with a portion of the lock casing or frame broken away to reveal the inner relationships;

Figs. 9, 10 and 11 are transverse sections taken on the lines 9—9, 10—10 and 11—11, respectively, of Fig. 7;

Fig. 12 is a fragment of a sectional view corresponding to Fig. 7, illustrating the parts in a slightly different position assumed as the bolt is being locked or unlocked; and Fig. 13 is a perspective view of a spring for yieldingly restraining movement of the tumblers.

But these drawings and the corresponding description are used for the purpose of illustration, and not to impose limitations on the claims.

In Figs. 1 and 2 there is shown a familiar form of transmission gearing assembled within a casing 10, the cover 11 of which includes a conical pedestal 12, having a spherical bearing 13 for the gear shift lever held in place by the fixed cap 14 threaded on the pedestal 12 and provided with a large opening 15 to allow ample movement for the gear shift lever and a movable cap 16, urged to its seat within the fixed cap 14 by a spring 17. The details of this mechanism varies in different automobiles. That shown is part of a familiar light automobile and the details are found in "Instruction Book, 112-inch Wheel Base, Ford V-8, Copyright 1934, Ford Motor Company, pages 37 to 39.

As shown in the drawings, the usual gear shift lever has been replaced by a lever embodying the present invention. The short arm 18 (Fig. 4) of this lever is made separate from the long arm 19, and the two are made one for the purpose of shifting gears by a bolt 20, mounted to slide within the tubular long arm and having a conical lower end 21 to fit within the corresponding hollow 22 in the short arm.

There is a head or flange at the upper end of the short arm convex below, as indicated at 23, to rest on the bearing 13 in the pedestal 12, and concave above, as indicated at 24, to receive and form a bearing for the convex surface 25 of the long arm 19.

When the bolt 20 is withdrawn to the dotted line position shown in Fig. 2, the two arms of the lever are independent, and the long arm can be shifted freely within the limits of its mounting, without moving the short arm to shift the gears.

The bolt 20 is held in its raised position by a combinaton lock, shown in detail on sheet 2 of the drawings.

The head of the short arm 18 and the flange 25 of the long arm 19 have aligned slots 26, 27, receiving a pin 28 in the pedestal 18 which serves to restrain rotation of the lever arms about a substantial vertical axis.

The short arm below the head will take its form according to the requirements of the particular transmission, thus making it possible to use the long arm with a variety of cars by assembling it with a suitably formed short arm.

The long arm will take its length, size and general form from the character of the automobile. That shown is bent to suit the conditions within the Ford V-8.

The bolt 19, as shown, is made of the lower portion, including the conical part 21, a length of chain 29, an upper cylindrical part 30, and a flat bar 31, cooperating with the tumblers 32 of the combination lock.

Each tumbler is in the general form of a ring or cylinder counter-bored at 33 to receive a reduced portion 34 on the tumbler below, and each is provided with a radial notch 35 to pass the lugs 36 on the bar or bolt portion 31, when it is to be moved up or down with respect to the lock.

The tumblers are assembled within a tubular frame or casing 37, fixed to the upper end of the tubular long arm 19, and forming a continuation of it. The casing has two windows 38 to expose suitable areas of the tumblers on which appear numerals, or other characters, indicating the position of the notches 35 with respect to the lugs 36 of the bolt.

Preferably the tumblers are bronze, or brass, and their adjacent faces are separated by steel washers 39, each having a rib 40 (Figs. 8 and 11) on its periphery, received in a lengthwise groove 41 on the interior of the frame or casing, by which means the washers are held against rotation relative to the tube.

The several tumblers and washers form a stack or series shiftable within narrow limits lengthwise against the resistance of a spring 42, at the bottom of the stack or series in this embodiment.

In one piece with the spring 42, here shown, is a strip 43 and a series of keys or feathers 44 struck from it and spaced to correspond with the positions of the washers 39. Each of the tumblers is provided on its outer surface with a series of grooves or recesses 45 corresponding in width to the keys or feathers 44.

One way popular with thieves for picking a lock of this general character is to press downwardly on the knob 46 by which the bolt is shifted, and then rotate each tumbler slowly until its notch 35 passes under the corresponding lug 36 on the bar 31, which position would be indicated by a slight movement sensible to the skilled touch. If this scheme is attempted with the lock made according to this invention the tumblers will move with the bar 31, (at least a portion of them, depending on the relative position of the several notches 35, with respect to the bar) due to the yielding of the spring 42 and grooves 45 will slip over the keys 44 and lock the plungers against rotary movement, thereby defeating the thief's purpose.

The bar or bolt 31 is provided with two notches 47 (Figs. 7 and 12) corresponding to the raised and lowered positions of the bolt. A latch 48 sliding at the bottom of the lock frame, or casing, cooperates with the surfaces of these notches as the bar is moved from one position to another, and shifts the strip 43 upwardly to bring the feathers 44 into the groove 45, as shown in Fig. 12, thus insuring that the tumblers will remain in the relative positions corresponding to unlocked condition while the bolt is shifted.

Within the casing on the opposite side from the strip 43 is another strip 49 of steel, brass, bronze, or the like, having a plurality of fingers 50 equipped with ribs 51 to yieldingly seat within the grooves 45 and thus tend to hold each of the tumblers in adjusted position. The side of the strip 49 opposite to the fingers 50 has a bead 52 received within corresponding notches 53 in the washers 39 which, being themselves fixed within the casing by the rib 40 and groove 41, hold the strip 49 in its proper position. The washers are also cut away at 54 to accommodate the strip 43.

The strip 49 has end flanges 55 and the strip 43 has an end flange 56 to cooperate with corresponding surfaces on the stack of tumblers and form a unit of assembly within the casing, the upper end of which is open for that purpose.

This open end of the casing is closed by a hollow plug 57 carrying a stem 58 on which is fitted the knob 59 forming the handle of the gear shift lever. The plug is secured in place by a latch bar 60 urged across the plug by a spring 61 into a shallow seat 62 on the inner wall of the casing.

The latch is released by forcing the bolt 31 upwardly to make its end strike a U-shaped shifter 63 fitted within the cylindrical bore 64 of the plug and having inclined slots 65 receiving the latch. The relationship between the lugs 36 and the tumblers is such that the bolt cannot be raised to release the latch 60 when any tumbler is in locked position.

The gear shift lever is used in the conventional manner and operates in all ways like the stock gear shift levers, for the purpose of shifting gears. When the car is to be locked the lever is set in neutral (or in reverse if desired) the bolt raised by pressing upwardly on the knob 46 and one or more of the tumblers is rotated from unlocked position. The two arms of the lever are thus disconnected entirely for all operative purposes and the long arm may be shifted within the limits of its mounting without affecting the gears.

When the car is to be used the tumblers are set to the unlocked combination, the bolt forced down where it will remain by its own weight, or it may be locked by turning one or more tumblers. In assembly the tumblers and washers are arranged in a stack, or series, with all of the notches 35 in line; in other words, in unlocked combination, and with all of the ribs 40 in line. The strips 43 and 49 are slipped onto the stack and this assembly is inserted within the casing and the bolt 31 entered from below. The latch 60 is pressed inwardly and the plug 57 inserted above and rotated to bring the latch in alignment with the seat 62. The remaining operations are obvious.

I claim as my invention:

1. In a combination lock, a hollow frame having a window, ring-like tumblers rotatably mounted in the frame and arranged in series shiftable lengthwise, washers, one between adjacent tumblers of the series, the tumblers and washers having similar notches in their outer surfaces, feathers in the frame normally entering the notches in the washers and entering the notches in the tumblers when shifted lengthwise.

2. In a combination lock, a hollow frame having a window, ring-like tumblers rotatably mounted in the frame and arranged in series shiftable lengthwise, washers, one between adjacent tumblers of the series, the tumblers and washers having similar notches in their outer surfaces, feathers in the frame normally entering the notches in the washers and entering the notches in the tumblers when shifted lengthwise, and yielding means to resist such shifting.

3. In a combination lock, a hollow frame having a window, ring-like tumblers rotatable within the frame and arranged in a series shiftable lengthwise, washers, one between adjacent tumblers of the series, a strip in the frame alongside the series of tumblers to hold the tumblers against rotation when shifted lengthwise, and a spring between the frame and one of the tumblers to resist the shifting.

4. In a combination lock, a hollow frame having a window, ring-like tumblers rotatable within the frame and arranged in series shiftable lengthwise, washers, one between adjacent tumblers of the series, a spring holding the series of tumblers against lengthwise movement and feathers within the frame to engage the tumblers when shifted lengthwise.

5. In a combination lock, a hollow frame having a window, ring-like tumblers rotatable within the frame and arranged in series shiftable lengthwise, a bolt movable lengthwise within the frame and cooperating with the tumblers to be locked or released, a latch engaging the bolt, and means operatively associated with the latch and movable lengthwise of the tumblers to restrain the tumblers from rotation while the bolt is being shifted.

6. In a combination lock, a hollow frame having a window, ring-like tumblers rotatable within the frame and arranged in series shiftable lengthwise, a bolt movable lengthwise within the frame and cooperating with the tumblers to be locked or released, a latch engaging the bolt, a spring cooperating with the latch and restraining the series of tumblers from shifting, and means operated by the latch and movable lengthwise of the tumblers to restrain relative rotation of the tumblers.

7. In a combination lock, a hollow frame having a window, ring-like tumblers rotatable within the frame and arranged in series shiftable lengthwise, a bolt movable lengthwise within the frame and cooperating with the tumblers to be locked or released, a latch engaging the bolt, a spring cooperating with the latch and restraining the series of tumblers from shifting, and means including a strip operated by the latch and movable lengthwise of the tumblers to hold the tumblers against rotation.

8. In a combination lock, a hollow frame having a window, ring-like tumblers rotatable within the frame having peripheral recesses and arranged in a series shiftable lengthwise, a strip in the frame alongside the series of tumblers having means adapted to enter the recesses to tie the tumblers against rotation when said means and tumblers are shifted relatively lengthwise, and another strip within the frame having means cooperating with the recesses to yieldingly restrain rotation of the tumblers.

9. In a combination lock, a hollow frame having a window, ring-like tumblers mounted in a series in the frame and manually accessible through the window for independent complete rotation, means yieldably positioning the series of tumblers in the frame, and means for locking the tumblers against rotation when shifted lengthwise against said yieldable means.

10. In a combination lock, a hollow frame having a window, a bolt within the frame having lugs, a series of ring-like tumblers mounted in the frame surrounding the bolt and manually accessible through the window for independent complete rotation and formed to cooperate with the lugs to lock or release the bolt, means yieldably positioning the series of tumblers in the frame, and means for locking the tumblers against rotation when shifted lengthwise against said yieldable means.

11. In a combination lock, a hollow frame, ring-like tumblers rotatable within the frame having peripheral recesses and arranged in a series shiftable lengthwise, means fixed in the frame alongside the series of tumblers having parts adapted to enter said recesses to tie the tumblers against rotation when said means and tumblers are shifted relatively lengthwise, and other means within the frame having means cooperating with the recesses to yieldably restrain rotation of the tumblers.

12. In a combination lock, a hollow frame open at one end, a bolt movable lengthwise in the frame, a series of tumblers cooperating with the bolt to lock it, a closure for the open end of the frame, a latch pin slidable through said closure and frame to secure the closure to the frame, and means for shifting the pin positioned beyond the normal withdrawn position of the bolt and adapted to be engaged and actuated by the bolt when moved beyond its normal withdrawn position.

13. In a combination lock, a hollow frame open at one end, a bolt movable lengthwise in the frame, a series of tumblers cooperating with the bolt to lock it, a closure for the open end of the frame, a latch pin slidable through said closure and frame to secure the closure to the frame and having a cam follower surface, and a shifter having a cam surface cooperating with the cam follower surface, said shifter being positioned beyond the normal withdrawn position of the bolt and adapted to be engaged by and moved with the bolt when the bolt is moved beyond its normal withdrawn position.

JOHANN BULANDA.